United States Patent
Benitez et al.

(10) Patent No.: US 8,182,100 B2
(45) Date of Patent: May 22, 2012

(54) FREE-FORM CONDENSER OPTIC

(75) Inventors: Pablo Benitez, Madrid (ES); Juan Carlos Miñano, Madrid (ES); José Blen Flores, Madrid (ES)

(73) Assignee: Light Prescriptions Innovators, LLC, Altadena, CA (US)

( * ) Notice: Subject to any disclaimer, the term of this patent is extended or adjusted under 35 U.S.C. 154(b) by 654 days.

(21) Appl. No.: 12/317,006

(22) Filed: Dec. 18, 2008

(65) Prior Publication Data

US 2009/0153808 A1    Jun. 18, 2009

Related U.S. Application Data

(60) Provisional application No. 61/008,102, filed on Dec. 18, 2007.

(51) Int. Cl.
*G03B 21/00* (2006.01)
*G03B 21/20* (2006.01)
*G03B 21/28* (2006.01)
*G02B 5/08* (2006.01)

(52) U.S. Cl. ........... 353/99; 362/298; 362/301; 362/346

(58) Field of Classification Search ............ 353/30, 353/37, 50, 51, 98, 99; 362/268, 346, 347, 362/518, 217.05, 217.06, 217.07, 297, 298, 362/301
See application file for complete search history.

(56) References Cited

U.S. PATENT DOCUMENTS

| | | | | |
|---|---|---|---|---|
| 3,917,384 A | | 11/1975 | Harper et al. ............ 350/96 WG |
| 4,345,815 A | | 8/1982 | Righini et al. ............ 350/96.18 |
| 4,457,600 A | * | 7/1984 | Hall ............ 353/122 |
| 4,505,551 A | * | 3/1985 | Jacobs ............ 359/232 |
| 4,610,502 A | | 9/1986 | Nicia et al. ............ 350/96.12 |
| 4,611,883 A | | 9/1986 | Myer ............ 350/96.11 |
| 4,712,856 A | | 12/1987 | Nicia ............ 350/96 |
| 5,745,294 A | | 4/1998 | Kudo ............ 359/618 |
| 5,798,823 A | | 8/1998 | Kudo ............ 355/67 |
| 5,966,250 A | * | 10/1999 | Shimizu ............ 359/727 |
| 6,082,864 A | * | 7/2000 | Rodriguez et al. ............ 353/87 |
| 6,356,700 B1 | * | 3/2002 | Strobl ............ 385/147 |
| 6,672,740 B1 | * | 1/2004 | Li ............ 362/298 |
| 7,458,687 B2 | * | 12/2008 | Silverstein et al. ............ 353/20 |
| 2004/0179371 A1 | * | 9/2004 | Morishita et al. ............ 362/517 |
| 2005/0086032 A1 | * | 4/2005 | Benitez et al. ............ 703/1 |
| 2008/0123338 A1 | * | 5/2008 | Kokado ............ 362/283 |
| 2008/0137344 A1 | * | 6/2008 | Lang et al. ............ 362/297 |
| 2008/0316761 A1 | | 12/2008 | Minano et al. ............ 362/518 |
| 2009/0153808 A1 | * | 6/2009 | Benitez et al. ............ 353/99 |
| 2010/0307586 A1 | * | 12/2010 | Benitez et al. ............ 136/259 |

FOREIGN PATENT DOCUMENTS

| | | |
|---|---|---|
| JP | 7-174974 A | 7/1995 |
| JP | 2006/163281 A | 6/2006 |
| WO | 2007/016363 A2 | 2/2007 |

\* cited by examiner

*Primary Examiner* — John R. Lee (74) *Attorney, Agent, or Firm* — Drinker Biddle & Reath LLP (57) ABSTRACT

A condenser for directing light from a UHP arc lamp or other generally cylindrical source onto a target such as a microdisplay in line with a front end of the lamp comprises a primary mirror to direct light from the source towards the back end of the condenser, and a secondary mirror at the back end of the condenser to direct the light from the primary mirror onto the target.

20 Claims, 12 Drawing Sheets

Fig. 1A

Target plane (where mixing rod entrance is placed)

Input wavefronts
- $WF_{I1}$ and $WF_{I2}$ tangent to the cylinder
- $WF_{I3}$ and $WF_{I4}$ come from the cylinder lids.

Spherical output wavefronts
- $WF_{O1}$ and $WF_{O2}$ for Initial Curve
- $WF_{O3}$ and $WF_{O4}$ for SMS chains

FREE-FORM CONDENSER OPTIC

TECHNICAL FIELD

The invention relates to optical systems, and especially to XX (two reflecting surfaces) optics, including such optics suitable for use as a condenser in a projection system.

BACKGROUND OF THE INVENTION

Similarly to the field lens of a telescope, the main function of the condenser optics in a projection system is to collect as much light as possible from the source and transmit it to a microdisplay or other imaging device, which will spatially modulate the light while transmitting the light towards the projection optics.

The importance of condenser lenses is the fact that the main bottleneck that limits efficiency in commercially available projection systems is their collector optics. Efficiency is a key parameter of projector performance, since it augments screen luminance, enabling the system to perform well under increasing levels of ambient light. Additionally, a higher efficiency also means less heat to extract and so less noise from the fans.

Most conventional condensers use elliptic or parabolic mirrors. They perform very far from the theoretical limits (calculated using the étendue invariance of nonimaging optics) for sources such as arc lamps or halogen bulbs. Typical small displays in the 5-15 mm$^2$·srad étendue range have ray collection efficiencies about 40-50% for the best condensers, although theory allows about 100%.

Figures 1A, 1B:
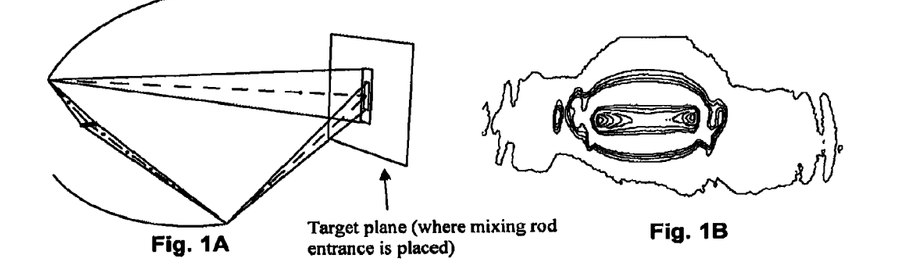
FIGS. 1A, 1B, 1C, and 1D (collectively FIG. 1) are a set of diagrams illustrating notable characteristics of the source images of a conventional elliptical condenser.
Figure 23:
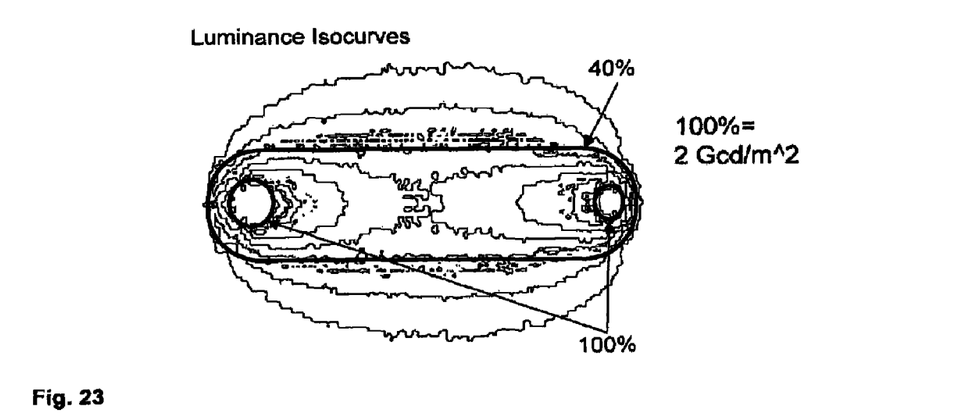
FIG. 23 is a diagram of a luminance distribution of an actual arc lamp.

To understand the limitations of conventional elliptic or parabolic condensers it is useful to consider the concept of the projection of source-images. A pinhole at the exit optical surface of the condenser will pass a bundle of rays that bears the local image of the source (see FIG. 1). A conventional elliptical condenser has a limited collection efficiency for small étendues because of these characteristics of its projected arc images. Most of the drawings show the arc as a surface-emitting cylinder, which is a schematic simplification of the actual non-homogeneous luminance distribution of an arc. Examples of the actual luminance distribution are shown in FIG. 1B and FIG. 23. This simplification is not used in the final design but it helps understand the inherent limitations of the elliptic condenser, because the étendue of the simplified arc is a better defined parameter than that of the real arc.

Figure 1C:
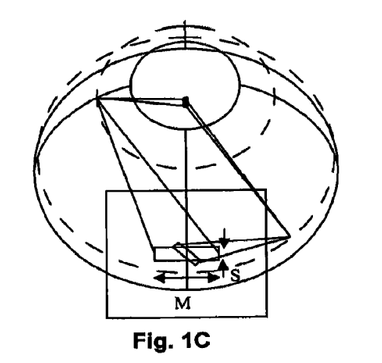
Figure 1D:
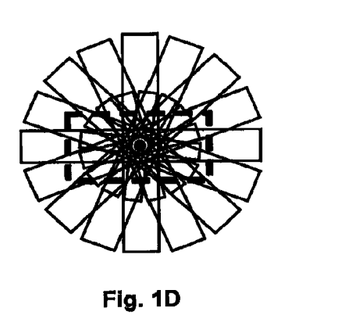

FIG. 1 shows notable characteristics of the source images of any conventional elliptical condenser: the length of the image is variable depending on which part of the condenser it is imaged by (see FIG. 1A); because they replicate the elongated shape of a light source such as an Ultra High Performance mercury arc lamp (UHP), the images are about 4 times longer than wide (see FIG. 1B); they rotate at the target due to the condenser's rotational symmetry (see FIG. 1C); and the source images do not fit well with the panoramic 16:9 target, shown as a dashed-line rectangle in FIG. 1D.

When the étendue of a microdisplay is much greater than the that of the arc, two of the aspects mentioned above (projected image size variation and images rotation) do not limit the collection efficiency, since the mixing rod entry aperture (shown as a dashed-line rectangle in FIG. 1D) will be much larger than all the projected arc images. This, however, implies the use of a large and expensive microdisplay. In the most cost-demanding applications the microdisplay étendue will be smaller and closer to that of the arc.

An interesting clarifying case is that in which both microdisplay and arc étendues are equal, because 100% ray-coupling efficiency is theoretically possible (since étendue is an optical invariant). It can be shown that in this equal-étendue case the mixing-rod entry aperture will have the same area as the average projected image. This makes it is clear that the variable size and the rotation of the images of the elliptical condenser do prohibit 100% ray-collection efficiency. A condenser achieving such 100% value would necessarily meet the condition that all projected images are rectangular and exactly match the contour of the mixing-rod entry aperture. This condition is general: it does not depend on the optical elements used in such a hypothetical 100% ray-collecting condenser, or even imply that such a design exists.

A recent trend in improving collection efficiency for small étendues has been to reduce the arc étendue by reducing the gap between the electrodes. Furthermore, some optical designs have being developed to improve the efficiency by:

Reducing the arc étendue via a hemispherical mirror concentric to the arc, which reflects half of the emitted light back to the arc (which is partially absorbent) and through it to increase its luminance. The light from the higher-luminance half-étendue arc is then collected by a conventional elliptical reflector.

Creating a side-by-side image of the arc with a decentered hemispherical mirror, and creating a composite 1:1 image of that via a dual parabolic reflector.

The equalization of the meridian length of the projected arc images, by correcting the elliptical mirror coma, using an aspheric reflector profile and an aspheric lens, but both surfaces still being rotationally symmetric.

These optical approaches, apart from their complexity and technological challenges, have limited gain capability because their optics are still restricted to being rotationally symmetric.

Other approaches to improve system efficiency include color recapture and color scrolling (which try to recover the ⅔ losses produced by the color filtering in single microdisplay projectors), or polarization-recovery techniques (which try to recover the 50% losses produced by the need of polarized light in LCD and LCoS systems). In these approaches, however, the resulting lamp étendue is accordingly increased (doubled and tripled in polarization and color recovery systems, respectively), further limiting the performance of small microdisplays that use classical condensers.

Other free-form XX condenser devices designed with the SMS 3D method were disclosed in our patent application WO 2007/016363 "Free form lenticular optical elements and their application to condenser and headlamps," which is incorporated herein by reference in its entirety. The devices shown therein in FIG. 43A to 44C, on the contrary to embodiments described herein, are better adapted to circular targets instead of rectangular ones. Those devices use the concept of étendue squeezing, which instead of focusing on avoiding the rotation of projected arc images, produce an equalization of their width and length as indicated in FIG. 43A to 44C of our application WO 2007/016363). The device shown in FIG. 45A-45C of our application WO 2007/016363 has in common with the embodiments in this application that also two halves are made and prevent rotation of images, but the configuration is such that the two halves of the secondary mirror are not adjacent but face one to another.

Regarding the state of the art of manufacturing condenser optics, all present systems are based exclusively on rotational-symmetric surfaces. These are manufactured mainly from glass (due to its low cost) or glass-ceramic (for higher thermal stability). The accuracy of both techniques is limited, so the manufactured profiles can differ substantially from those intended.

SUMMARY OF THE INVENTION

In this specification the SMS3D methods are applied to free-form mirror optics with high numerical aperture and efficiency, with which it is possible to guarantee that the projected source images do not rotate. The nomenclature used is given in the glossary of terms at the end.

The SMS3D design method provides full control of two couples of wavefronts and partial control of a third one. Thus the size, position, and orientation of the projected source-images can be controlled to an unprecedented level. SMS-designed dual reflector devices are herein termed XX. In order to clarify the various XX condenser families, this section considers the design of an XX that must collect the light emitted by a rectangular flat source and transfer it to a rectangular flat target, in the geometric configuration shown in FIG. 2. The light source is placed in the y=0 plane and emits in the y>0 directions. The target is placed in a z=constant plane and will receive the emitted light in z>0 directions.

One aspect of the invention provides an optical system for directing light from a source onto a target generally in line with a first end of the source, the optical system comprising a primary optical element arranged to direct light from the source towards a second end of the condenser opposite the first end of the cylinder, and a secondary optical element arranged at the second end of the condenser to direct the light from the primary optical element onto the target, wherein at least 70% of the light reaching the target from the source reflects off both the primary and the secondary optical elements.

One aspect of the invention provides a condenser for directing light from a generally cylindrical source onto a target generally in line with a first end of the cylinder, the condenser comprising a primary reflective or other optical element arranged to direct light from the source towards a second end of the condenser opposite the first end of the cylinder; and a secondary reflective or other optical element arranged at the second end of the condenser to direct the light from the primary optical element onto the target, wherein substantially all of the light reaching the target from the source reflects off both the primary and the secondary optical elements.

The primary and secondary optical elements may be so shaped that images of the source on the target from all parts of the primary optical element are formed on the target with substantially the same shape, size, and orientation.

The primary and secondary optical elements may be so shaped that images of the source on the target from all parts of the primary optical element are formed on the target with substantially the same shape and size, wherein the images are rectangles more nearly square than the ratio of length to diameter (L/D) of the source.

The images may have a ratio of length to width in the range of from one quarter to two thirds, preferably ⅖ to ½, of L/D.

The primary optical element may be segmented into a first plurality of arcuate sectors towards the first end and a second plurality of arcuate sectors towards the second end. The arcuate sectors of the first plurality may be staggered circumferentially relative to the arcuate sectors of the second plurality. The secondary optical element may then be segmented into a third plurality of arcuate sectors equal in number to the sum of the first and second pluralities so that each sector of the third plurality faces a respective sector of the first or second plurality; and each sector of the primary optical element directs light from the source onto the facing sector of the secondary optical element, which directs the light onto the target.

Another aspect of the invention provides a lamp assembly comprising a condenser according to the invention with a cylindrical lamp as the source.

A further aspect of the invention provides a projector comprising a lamp assembly according to the invention, an image-forming modulator at the target, and projection optics to project an image generated by the modulator acting on the light from the lamp assembly.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION OF THE DRAWINGS

Referring to the accompanying drawings, the SMS3D design method provides full control of two couples of wavefronts and partial control of a third couple of wavefronts. Thus the size, position, and orientation of the projected source-images can be controlled to an unprecedented level. SMS-designed dual reflector devices are herein termed XX. In order to clarify the various XX condenser families, this specification considers by way of example the design of an XX that must collect the light emitted by a rectangular flat source and transfer it to a rectangular flat target, in the geometric configuration shown in FIG. 2. The light source is placed in the y=0 plane and emits in the y>0 directions. The target is placed in a z=constant plane and receives the emitted light in z>0 directions.

Figure 2:
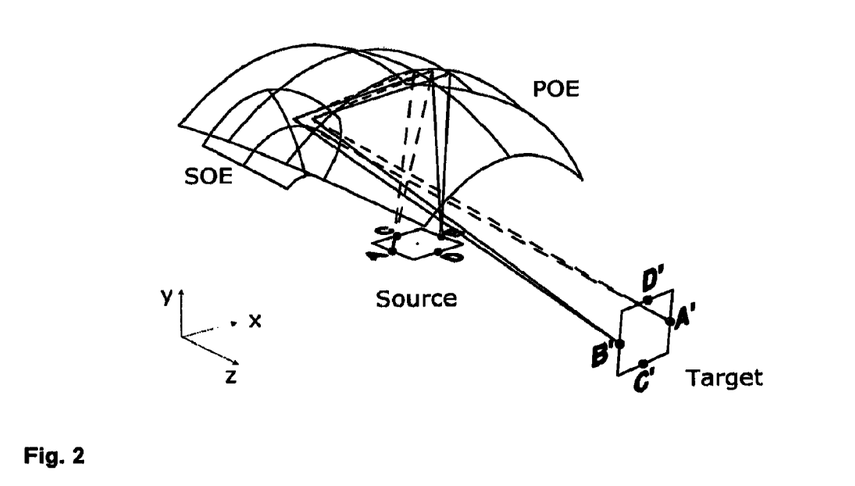
FIG. 2 is a diagram of an example of an XX 3D optical system.

FIG. 2 shows an example of an XX 3D optical device, formed by two free-form mirrors, a primary optical element (POE) and a secondary optical element (SOE). The device shown in FIG. 2 may be an imaging device with an image source or modulator, such as a DMD chip from Texas Instruments, Inc. at the source, producing an image at the target, which may be viewed or otherwise used there, or may be further projected. The device may be a condenser, with a light source at the source and an image source or modulator at the target. The device may be a condenser, with a light source at the source and a light pipe or further light processing device having its intake at the target. Other embodiments described below are better suited for use as a condenser than as an imaging projector. Therefore, in the interests of brevity, embodiments of the devices described may be referred to as "condensers," and the use of the term "condenser" in this description should not be taken as limiting in the case of those optical devices that are capable of other use.

If the source size is small enough compared to the condenser size, and assuming that the device will control the third set of wavefronts (only guaranteed at the seed rib), the following linear mapping between the source and the target holds:

$$\begin{pmatrix} x' \\ y' \end{pmatrix} = \begin{pmatrix} N & 0 \\ 0 & M \end{pmatrix} \begin{pmatrix} x \\ z \end{pmatrix} + \begin{pmatrix} c_1 \\ c_2 \end{pmatrix} \quad \text{Eq. (1)}$$

where (x',y') is a point of the target, (x,z) is a point of the source (the same global coordinate system x-y-z for source and target is being used), and $c_1$ and $c_2$ are constants that define the mapping of the center of the source to the center of the target.

This mapping implies that in the first-order approximation (i.e., for a small source) the SMS method provides an image-forming design whereby the light source is placed on the object plane and the target on the image plane. In FIG. 2, points A, B, C and D are object points while A', B', C' and D' are their corresponding image points.

Because the optical configuration of FIG. 2 permits specific source points to be mapped to specific target points, it can be used as an imaging device, projecting an image of the source onto the target, as well as being used as a condenser.

The diagonal of the matrix in Equation 1 defines the magnification of the optical system. In a general case, constants M and N, generally unequal, are defined as:

Magnification M: ratio between the side of the target parallel to the y axis, H', and the side of the source parallel to the z axis, H. It is defined as: M=H'/H.

Magnification N: ratio between the side of the target parallel to the x axis, W', and the side of the source parallel to the x axis, W. It is defined as: N=W'/W.

For the calculation of the initial curve (i.e., the SMS seed rib), two source wavefronts (labelled A and B in FIG. 3) are placed such that the line joining them is parallel to the x axis of the coordinate system. The line that joints the target wavefronts A' and B' will be parallel to the x axis of the coordinate system as well, see FIG. 3.

Figure 3A:
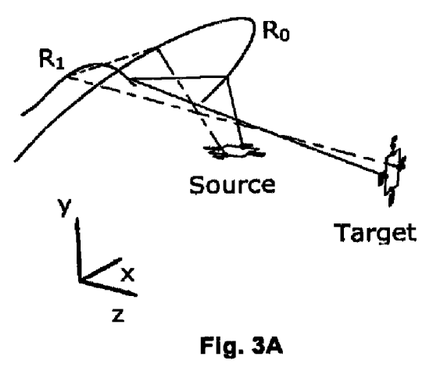
FIGS. 3A and 3B (collectively FIG. 3) are a pair of diagrams illustrating an initial curve $R_0$ (seed rib) calculation from different viewpoints.
Figure 3B:
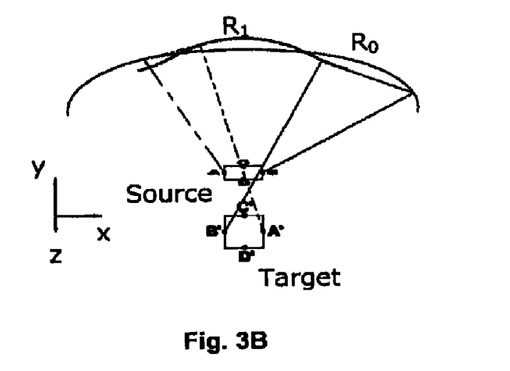

Referring now to FIG. 3, the initial curve R0 (seed rib) calculation is done with source-diverging spherical wavefronts emitted from points A and B and target-converging spherical wavefronts centered on A' and B'. This two-point mapping defines magnification N (which is negative in FIG. 3, because A' and B' are interchanged across the x=0 plane compared with A and B).

Figure 4A:
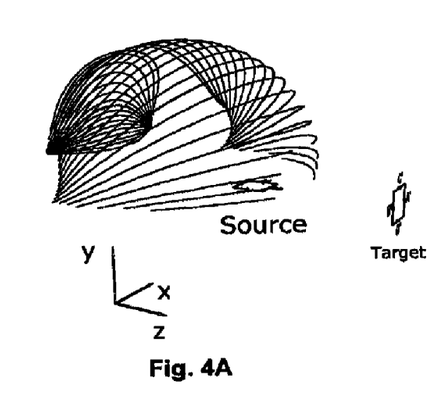
FIGS. 4A and 4B (collectively FIG. 4) are a pair of diagrams illustrating an SMS-ribs calculation.
Figure 4B:
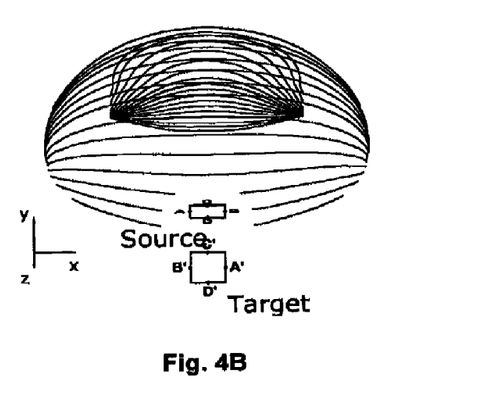

As shown in FIG. 4, for the SMS-ribs calculation, two source wavefronts (labeled C and D in FIG. 4) are placed such that the line joining them is parallel to the z axis of the coordinate system. The line that joins the target wavefronts C' and D' will be parallel to the y axis of the coordinate system. This two-point mapping defines magnification M (which is negative in FIG. 4 because C' and D' are interchanged compared with C and D, using the positive directions of the y and z axes as reference).

The calculation of the seed rib ($R_0$) and the rest of the SMS-ribs as described here uses four wavefront pairs. A calculation using only three wavefront pairs is possible, but the calculation using four pairs is more practical because it can guarantee the symmetry of the device with respect to plane x=0.

The SMS method induces a parameterization on the surfaces derived from the parameterization used in the seed patch. One of the parameters is the parameter u induced from the seed rib. The curves with u=constant are called spines. In general, an arbitrary parameterization of the seed patch leads to spines that are not $C^0$ curves. In order to have $C^0$, $C^1$, etc. spines, continuity conditions must be forced upon the seed patch parameterization. Such continuity level is not relevant from a theoretical point of view (in any case, the surfaces remain the same, only their parameterization changes). In practice, however, the surfaces are to be modeled in the calculation process of current examples (for instance, using b-splines), and then, suitable parameterizations are required for accurate surface modeling.

Figure 5A:
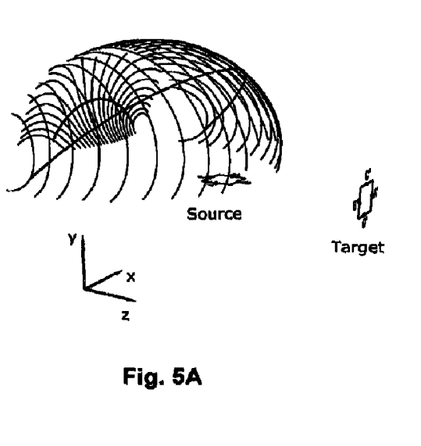
FIGS. 5A and 5B (collectively FIG. 5) are a pair of diagrams illustrating spines as coordinate curves on the SMS surfaces induced by the seed patch parameterization and SMS construction of FIGS. 3 and 4.
Figure 5B:
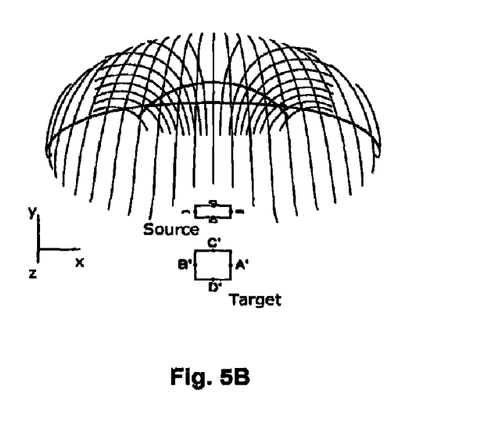
Figure 6A:
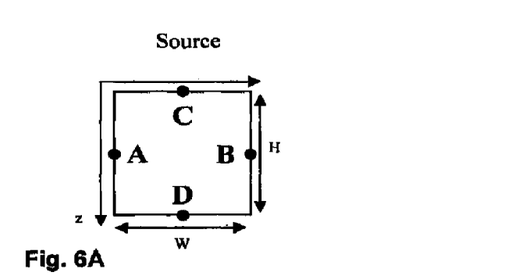
FIGS. 6A through 6E (collectively FIG. 6) are a set of diagrams showing how the signs of magnifications M and N leads to four possible families of the XX condenser.
Figure 6B:
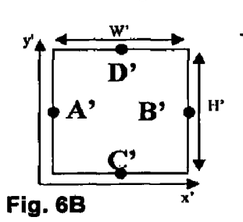
Figure 6C:
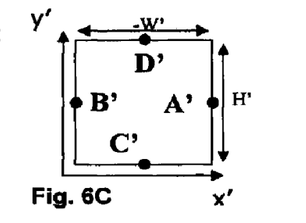
Figure 6D:
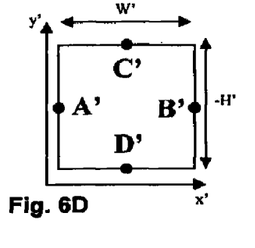
Figure 6E:
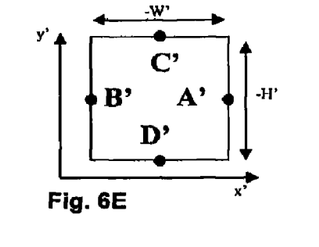

FIG. 5 shows spines on the XX optical elements of FIG. 4 as coordinate curves on the SMS surfaces induced by the seed patch parameterization and SMS construction.

Magnification parameters M and N can be either positive or negative, so four families of XX can be considered, which are illustrated in FIG. 6. Selecting the appropriate family will depend on the specific goals (geometrical and optical) for a given application.

FIG. 6 shows how the signs of the magnifications M and N lead to four possible families of the XX condenser. FIG. 6A shows the source wavefronts generated from points A, B, C and D. FIGS. 6B through 6E show corresponding target wavefronts A', B', C', and D' for (FIG. 6B) M>0, N>0; (FIG. 6C) M>0, N<0; (FIG. 6D) M<0, N>0; (FIG. 6E) M<0, N<0.

The XX design for a cylindrical source may be determined as follows.

The XX 3D configuration and geometry introduced in the previous section can also be applied for a cylindrical source. This is of practical interest in condenser applications, because the resulting design, as shown below, can efficiently couple the light into a rectangular aperture. This is due to SMS3D's control of the projected source images, its nonrotational projection, and its constancy of projected size (perfectly in at least one dimension, guaranteed around the seed rib in the perpendicular dimension).

Figure 7:
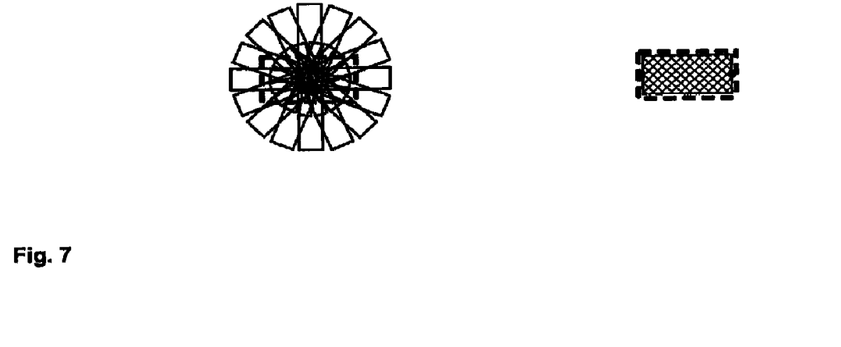
FIG. 7 is a pair of diagrams comparing the alignment of projected arc images with a rectangular target aperture in a conventional condensers (left) and an XX 3D condenser (right).

Referring to FIG. 7, the present XX 3D condenser (right), in contrast to conventional condensers (left), can be designed to avoid the rotation of projected arc images so that all the projected images can fit a common rectangular aperture (in FIG. 7, the non-uniformity of the arc luminance is not shown).

Figure 8:
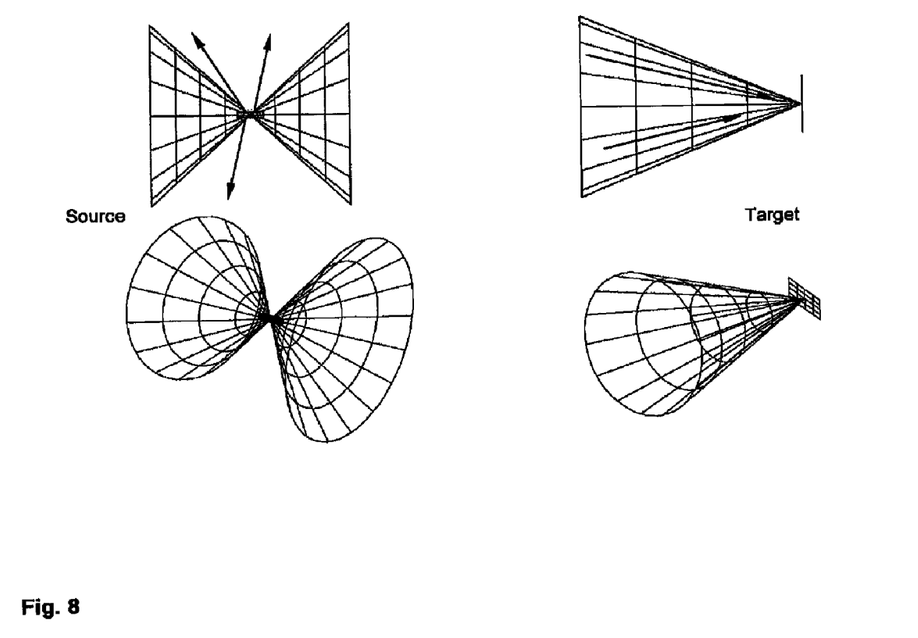
FIG. 8 is a set of diagrams illustrating source and target definitions.

Consider the formal definition of this problem, as shown in FIG. 8, which depicts source and target definitions for the requirement for an XX to collect and transfer the light emitted by a cylinder and transfer it to a rectangular planar target, with the angular fields of view illustrated in FIG. 8.

In order to collect light coming from the field of view of such a source, an XX design similar to that in FIG. 2 can be calculated to collect half the light (that emitted towards y>0). The other half (emitted towards y<0) goes to reflectors that may be assumed to be symmetrical with the calculated reflectors in the plane y=0. The input and output wavefronts to be used in the design are indicated in FIG. 9.

Figure 9:
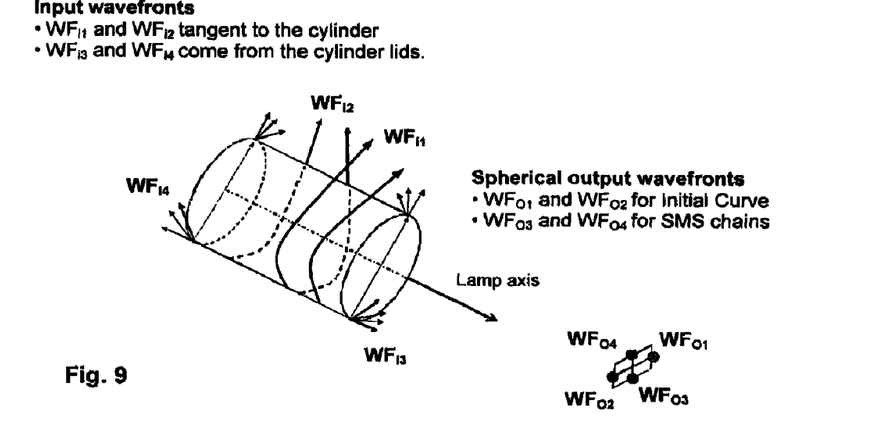
FIG. 9 is a set of diagrams illustrating definitions of wave fronts that control the emitting characteristics of the cylindrical source.

FIG. 9 illustrates the definition of wave fronts (WFs) that control the emitting characteristics of the cylindrical source. In FIG. 6, four families of solutions were defined according to the signs of the magnifications. Since the input source is no longer a plane, the classical definition of magnification does not apply, but the four families still appear as a consequence of the wavefront pair assignment, and for simplification of the nomenclature of the families the reference M and N magnification signs will be still used.

To illustrate this, FIG. 10 shows the spines contained on the plane x=0 for families with the two possible signs of M. Note in this 2D section that, when M>0, the rays of any of the two input wavefronts, after being reflected at the primary optical element (POE), will form a real caustic before reaching the secondary optical element (SOE). On the other hand, when M<0, the caustics will be virtual (i.e. the notional continuation of the rays will form the caustic outside the segment of ray trajectories between POE and SOE). This implies that, for the optics at y>0, the rays emitted from the source towards the points of the POE with high/low z-values will be reflected towards the points of the SOE with respectively low/high y-values in the case M>0, and towards the respectively high/low y-valued SOE points in the case M<0 (see FIG. 10).

Figure 10A:
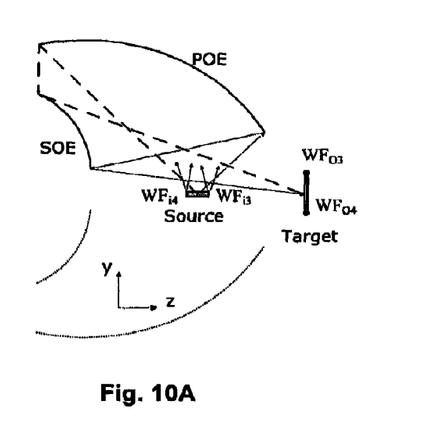
FIGS. 10A and 10B (collectively FIG. 10) show spines contained on plane x=0 for two XX families.
Figure 10B:
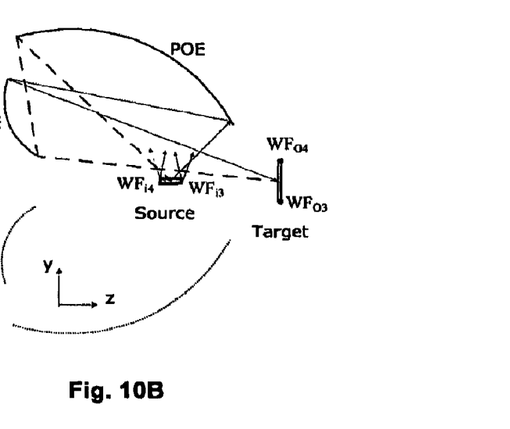

Thus, FIG. 10A shows spines contained on plane x=0 for the XX families with magnification sign M>0, and FIG. 10B shows spines contained on plane x=0 for the XX families with magnification sign M<0.

Figure 11:
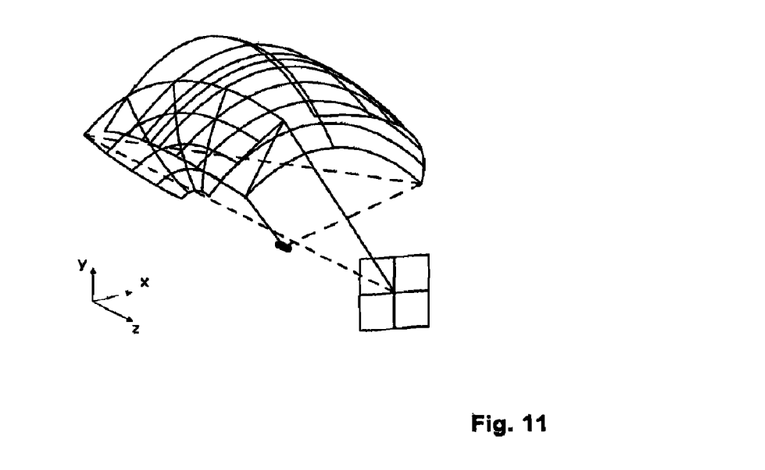
FIG. 11 is an illustration of an XX design with N>0.

Regarding the sign of the magnification equivalent to N, which affects the seed rib calculation, while FIG. 3 showed one case with N<0, FIG. 11 shows one with N>0. As can be seen in these Figures, analogously to the significance of the sign of M just described, the rays emitted from the source towards the points of the POE with x>0 will be reflected towards the points of the SOE with x>0 in the case N<0, and towards the point with x<0 in the case N>0.

The four families of XX generated by the two possible signs of M and N can be equivalently described by the real or virtual nature of their two caustic surfaces in 3D.

Since the cylindrical source emits light towards both y>0 and y<0 half-spaces, there is still another Boolean variable to be added to the signs of magnifications M and N, raising the four families of XX solutions to eight. This third Boolean variable appears from the additional possibility of choosing that the half of the POE mirror at y>0 reflects the light towards the half of the SOE at y>0 (as shown in all previous Figures) or towards the half of the SOE at y<0, as shown in FIG. 12.

Figure 12:
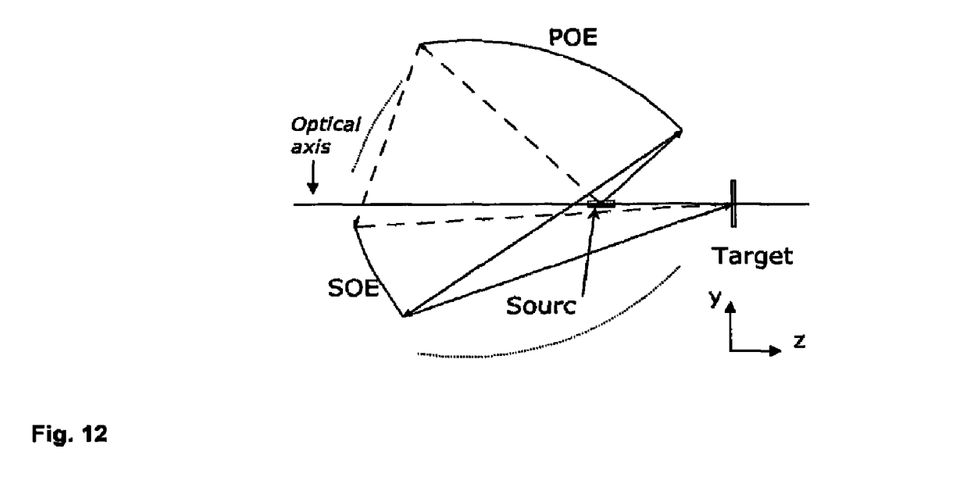
FIG. 12 shows spines contained in x=0 of one design variation.

FIG. 12 shows spines contained in x=0 of one design variation in which the half of the POE mirror at y>0 reflects the light towards the half of the SOE at y<0, and the paired POE and SOE halves are not adjacent. For use as a condenser in a lamp with all-round emission, it is assumed that the half-mirrors shown in FIG. 12 will be duplicated by mirrors on the opposite sides of the y=0 plane. A configuration using a single SOE half and a single POE half, on opposite sides of the y=0 plane as shown in FIG. 12, may be used in an imaging configuration as a modification of that shown in FIG. 2. In a non-imaging configuration, such as a condenser, the same FIG. 2 or FIG. 12 configuration can be used to project the source onto the target with a desired size and orientation. A configuration using two SOE halves, and the corresponding two POE halves, may be used to produce a non-circular illumination of the target, because with, for example, a cylindrical source, both halves can produce coincident rectangular illumination of the target by imaging the rectangular view of the cylindrical source onto the target.

Figure 13:
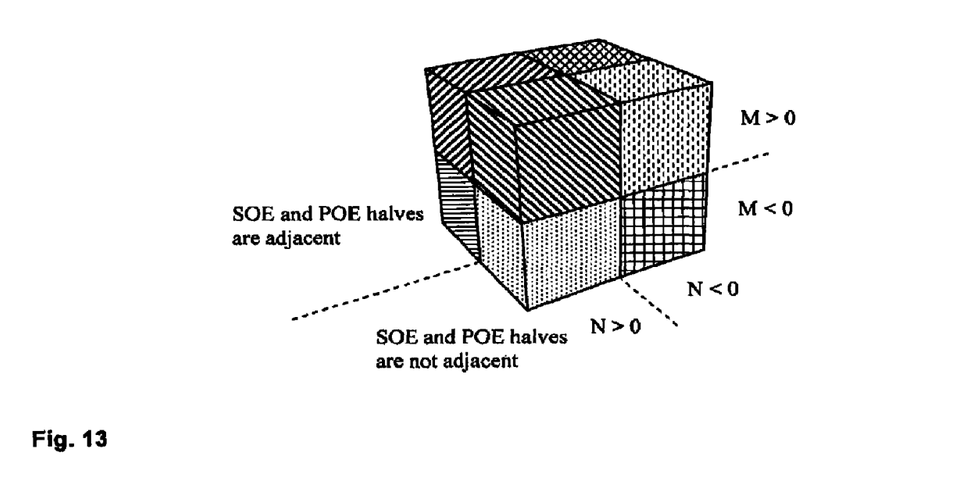
FIG. 13 is a diagram summarizing the 8 families of XX condenser designs conceived for a cylindrical source.

FIG. 13 is a diagram summarizing the 8 families of XX condenser designs conceived for a cylindrical source.

All the aforementioned families of this XX condensers type have been explored. Ray tracing results are now described only for the case with the best performance of those explored, which has M<0, N<0 and with POE and SOE paired halves located at opposite sides of the y=0 plane (i.e., not adjacent). That "best performance" is defined as maximum power transfer between the source and target, as illustrated in FIG. 8 for the case in which both have the same étendue in three dimensions.

Figure 14:
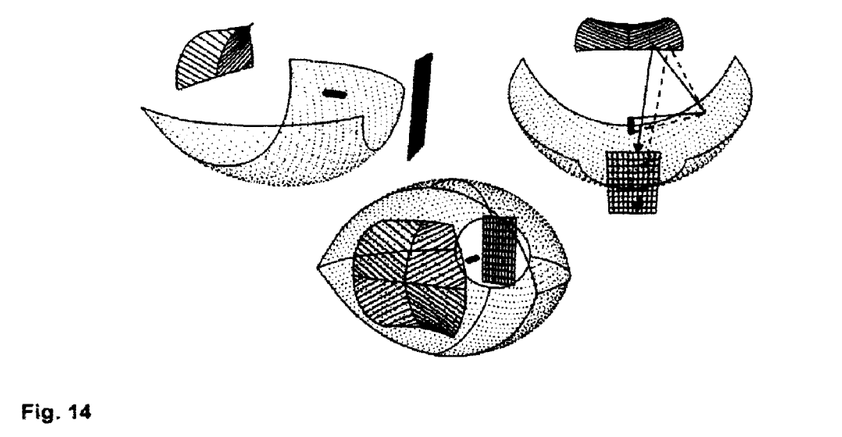
FIG. 14 shows one selected XX design.
Figure 24:
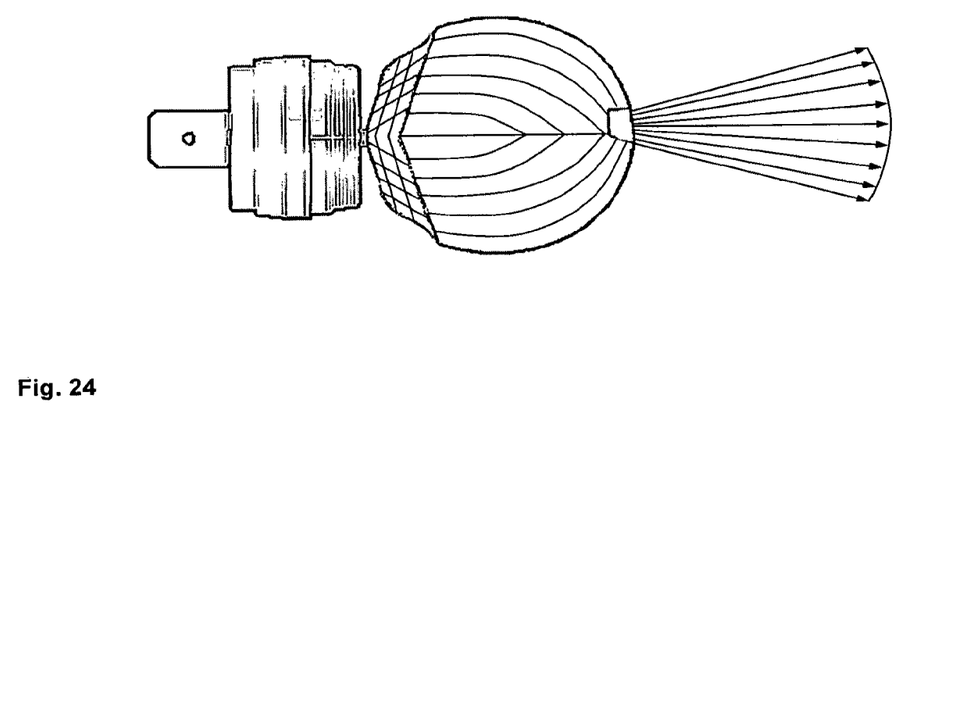
FIG. 24 is a side view of a lamp system similar to that of FIG. 14 integrated into a bulb.

The input parameters of the design are:
Cylindrical source: Length L=1.2 mm; Diameter D=0.3 mm; emission restricted to rays forming more than $\beta_{MAX}=45°$ from the cylinder axis.
Rectangular flat target: Aspect ratio=4:1; reception restricted to rays forming less than $\phi_{MAX}=19°$ with the normal to the target.
Distance from source center to target plane: 30 mm FIG. 14 shows the surfaces of the mirrors of the selected XX design of the family M<0, N<0 and non-adjacent POE and SOE paired halves (only POE with y<0 and SOE with y>0 are shown at the top). Source and targets are not shown to scale. As may be seen in FIG. 14, the paired secondary optical elements can be formed as a single component, with a linear seam or ridge where the two SOE surfaces meet in the y=0 plane, without the central hole that is common in previously proposed devices, and with the SOE surfaces well defined and optically effective over their whole area. In the configuration shown in FIGS. 21 and 22 below, a central hole in the SOE may be useful to provide a place for a mount and electrical connector at one end of the UHP arc or other lamp. However, as shown in FIG. 24, it is possible for a device such as that of FIG. 14 to be constructed with the POE and SOE formed as metalized areas on the surface of a molded glass bulb, which can also serve as the envelope of the lamp itself. The power supply and electrode or filament support for the lamp may then be only a pair of wires passing through the glass envelope, and the central part of the SOE can be effectively used.

Figure 15:
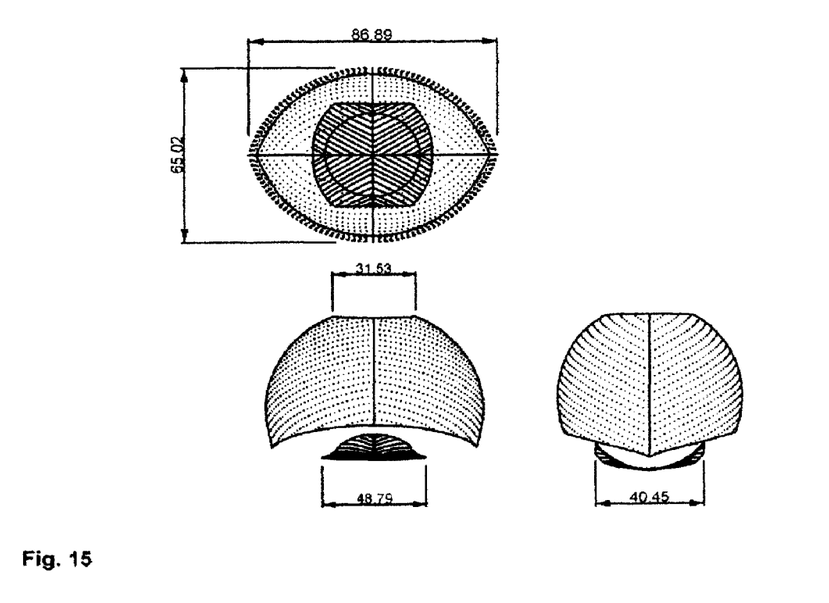
FIG. 15 shows geometrical dimensions of the selected XX design of FIG. 14.

FIG. 15 shows the standard top, side and front views, indicating the Geometrical dimensions of the selected XX design of FIG. 14. The POE is 86.89 mm maximum width in the x direction, and 65.02 mm maximum height (notional diameter across both y>0 and y<0 halves) in the y direction. The diameter of the open end of the POE facing the target, which defines the circular field of view of the condenser, is 31.53 mm. The SOE is 48.79 mm maximum width in the x direction and 40.45 mm maximum height in the y direction.

Figure 16:
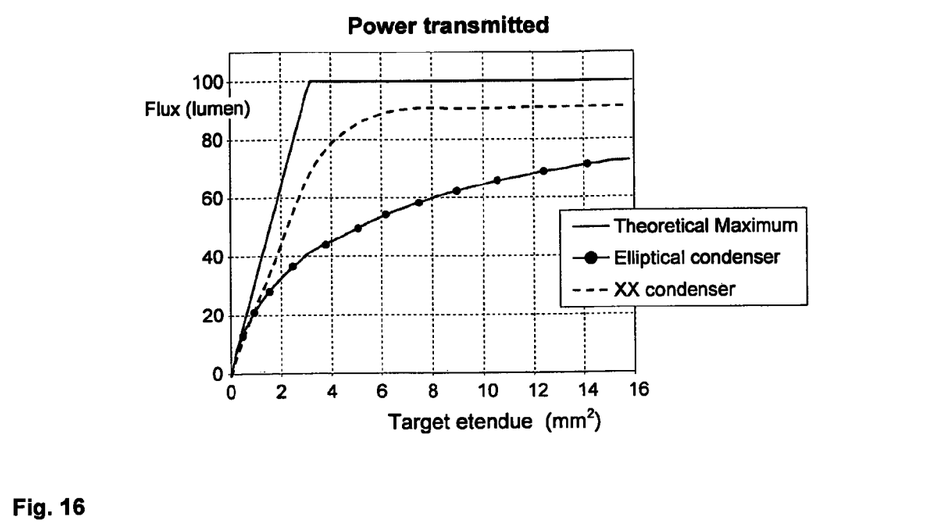
FIG. 16 is a graph of ray tracing results for the condenser in FIG. 14.

In order to evaluate performance, the collection efficiency versus target étendue was calculated by ray-tracing (using the commercial ray-tracing package LightTools®, see www.opticalres.com) and it is shown in FIG. 16.

The étendue of the target was varied while keeping the circular field of view fixed and varying target sizes with the same aspect ratio (4:1). Therefore, the target étendue is given by:

$$E_{target} = A_{target} \pi \sin^2(\phi_{MAX}) \qquad \text{Eq. (2)}$$

where $A_{target}$ is the target area and $\phi_{MAX} = \pm 19°$ for the XX.

FIG. 16 shows collection efficiency versus the 3D étendue of the target for the condenser in FIG. 14, as determined by ray tracing. For comparison purposes, FIG. 16 shows two further curves. One of them is collection efficiency versus target étendue for a conventional elliptical reflector working for the same source and a target with the same aspect ratio (4:1). The eccentricity of the ellipsoid has been set equal to 0.8 (which is the optimized standard) and that target field of view of $\phi_{MAX} = \pm 30°$ (which is also the standard value in the market).

The third curve in FIG. 16 corresponds to the theoretical limit, which is deduced by étendue considerations: an ideal condenser achieving it (which may not exist, none is known at present) would transfer all the source power to the target if the target étendue is greater than the source étendue, and would fully fill the target étendue with light from the source if the source étendue is larger than the target étendue. This implies that the ideal condenser will have a collection efficiency versus target étendue curve given by:

$$\eta = 1 \text{ if } E_{target} \geq E_{source} \qquad \text{Eq. (3)}$$

$$\eta = \frac{E_{target}}{E_{source}} \text{ if } E_{target} \leq E_{source}$$

where $E_{source} = 3.13$ mm$^2$, obtained by direct computation from the input data and the cylindrical source geometry as:

$$E_{source} = \pi DL(\pi + \sin(2\beta_{MAX}) - 2\beta_{MAX}) + \frac{1}{2}\pi^2 D^2 (1 - \sin^2 \beta_{MAX}) \qquad \text{Eq. (4)}$$

FIG. 16 shows that the XX performs much better than the elliptical reflector (for all mirrors, specular reflectivity has been set equal to 1), getting close to the theoretical limit. There are three factors preventing the XX from reaching the theoretical limit:

1. When target étendue is large, some rays that reflect off the POE will miss the SOE, so that the XX curve cannot reach 100% collection efficiency.

2. The "shoulder" of the XX efficiency curve is rounded (in contrast to the theoretical one, which shows a slope discontinuity). This is due to the non-stepped transitions of the illuminance distribution on the target plane and also to the rounded contour lines of the illuminance distribution, as shown in FIG. 18.

3. When target étendue is small, the slope of the XX curve in FIG. 16 is less than the theoretical slope, because the XX does not fill completely and uniformly the circular field of view (see the intensity distribution in FIG. 19).

Figure 17:
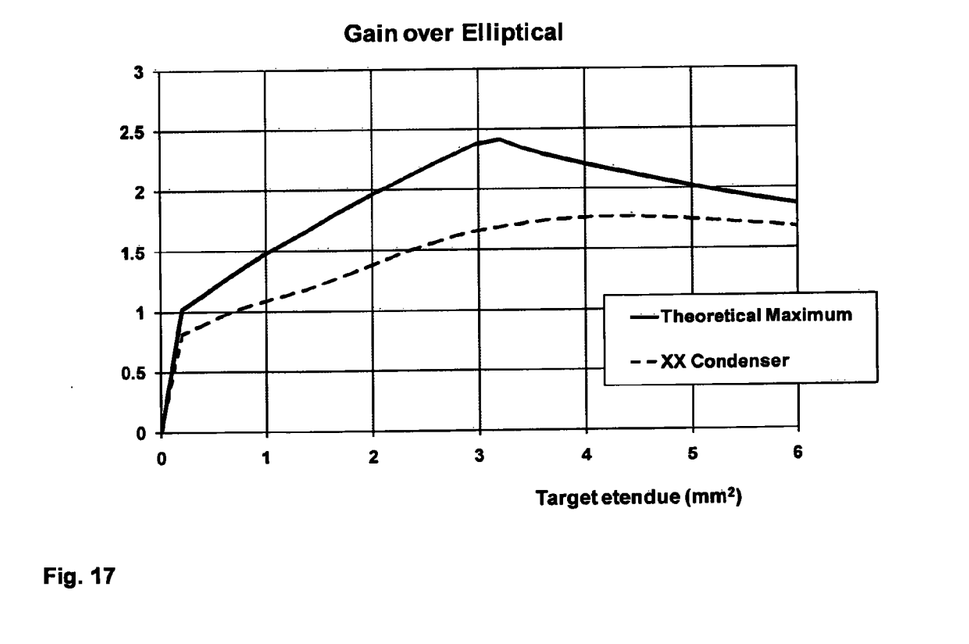
FIG. 17 is a graph of ray tracing results for the elliptical condenser. XX in FIG. 14.

FIG. 17 shows a plot of gain against étendue, as determined by ray tracing. Gain is defined as the ratio of the collection efficiency of a given non-conventional condenser to that of the elliptical condenser. The XX device of FIG. 14 shows gains up to 2 in a wide range of étendue. The theoretical limit could achieve gains up to 3.

Figure 18:
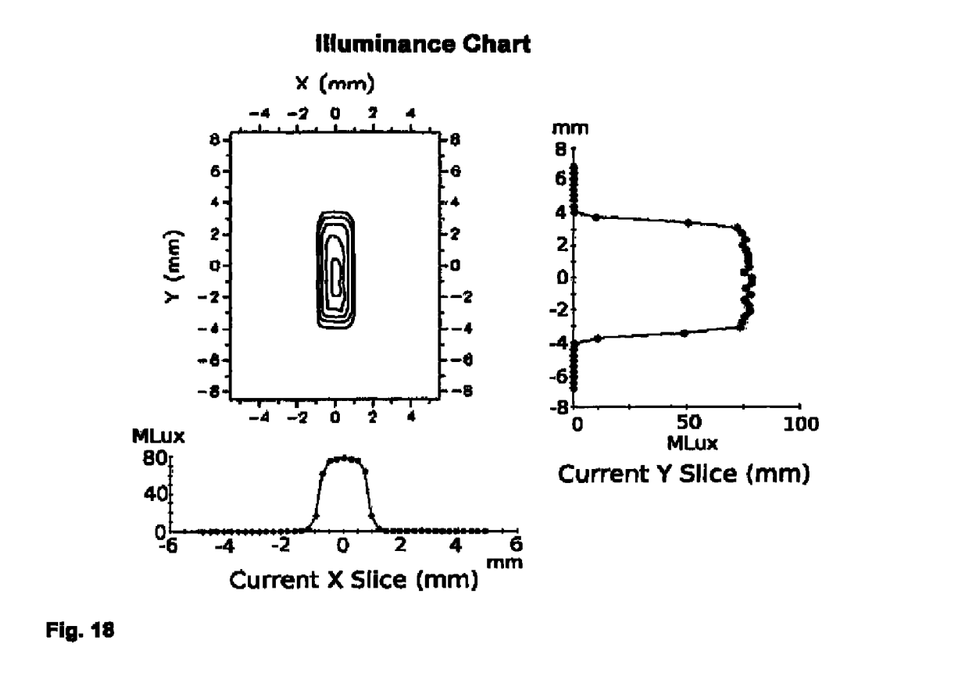
FIG. 18 shows ray tracing results for illuminance distribution on the target plane for the condenser in FIG. 14.

FIG. 18 shows the illuminance distribution on the target plane for the XX condenser of FIG. 14, assuming the source has a flux of 1000 μm, as determined by ray tracing.

Figure 19:
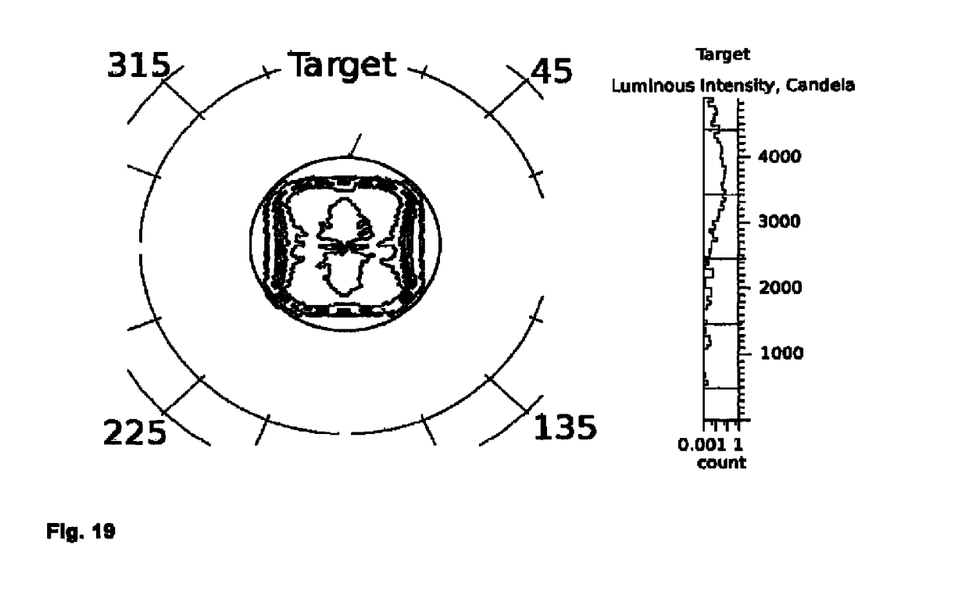
FIG. 19 shows further ray tracing results for the condenser in FIG. 14.

FIG. 19 shows the intensity distribution through the target plane for the XX condenser of FIG. 14, assuming the source has a flux of 1000 lm, as determined by ray tracing.

Figure 20:
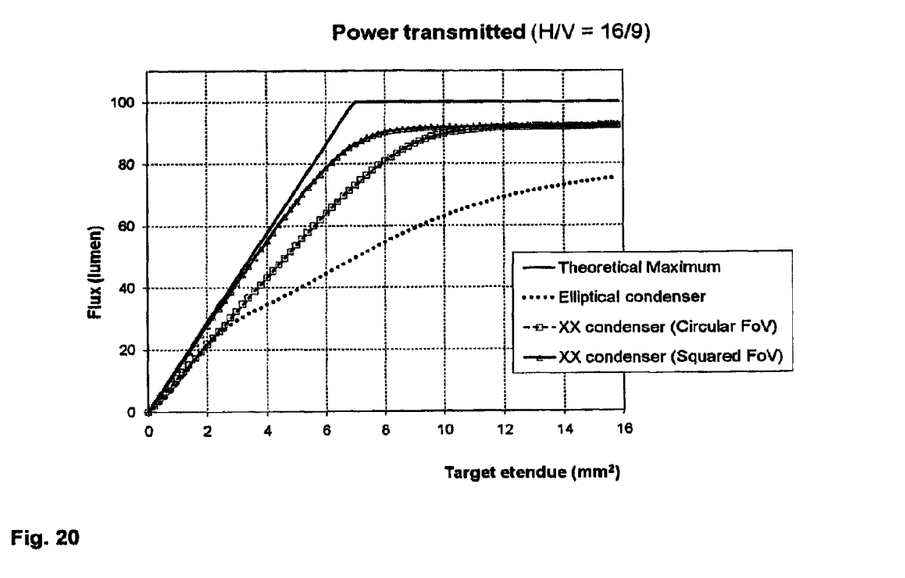
FIG. 20 is a graph of ray tracing results relating the collection efficiency of an XX condenser versus the 3D étendue of a 16:9 target.

A target with a 4:1 aspect ratio is not usually seen in projection display applications. On the contrary, the 16:9 format can be considered the present standard. FIG. 20 shows the ray tracing results for an XX condenser similar to that in FIG. 14, designed to produce a 16:9 irradiance distribution on the target plane. FIG. 20 assumes a cylindrical source with diameter 0.62 mm (source étendue=6.96 mm$^2$) and keeping the rest of the parameters unchanged from FIG. 14. The XX for the circular field of view still performs better than elliptical reflector, although the gain is reduced to 1.5, due to the lower aspect ratio of the target (again, for all mirrors, specular reflectivity has been set equal to 1). The theoretical limit is also reduced to 2.

As an academic consideration, it is interesting to note that these XX condensers perform closer to the theoretical limit if a square field of view for the target is considered. FIG. 20 also shows the collection efficiency and target étendue using a square field of view of 14°×14° for the XX at the target. The theoretical limit stays unchanged but the XX performs much better because its intensity distribution matches better with the square field of view. The slope of the efficiency curve of the XX with square field of view becomes now very close to the theoretical limit near the origin, indicating a uniform and well-filled field of view.

Figure 21A:
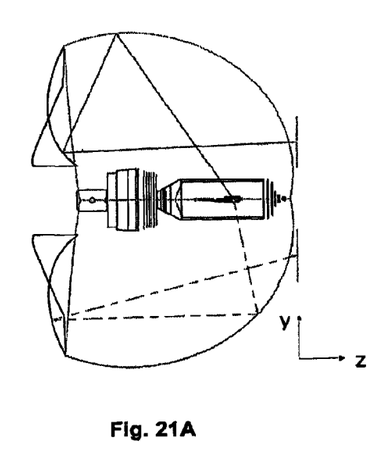
FIGS. 21A and 21B (collectively FIG. 21) are diagrams of a demonstrator prototype.
Figure 21B:
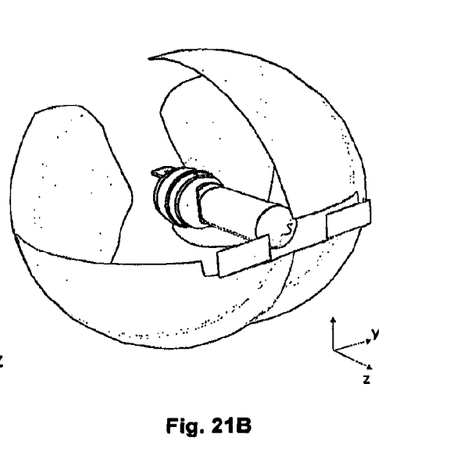
Figure 22:
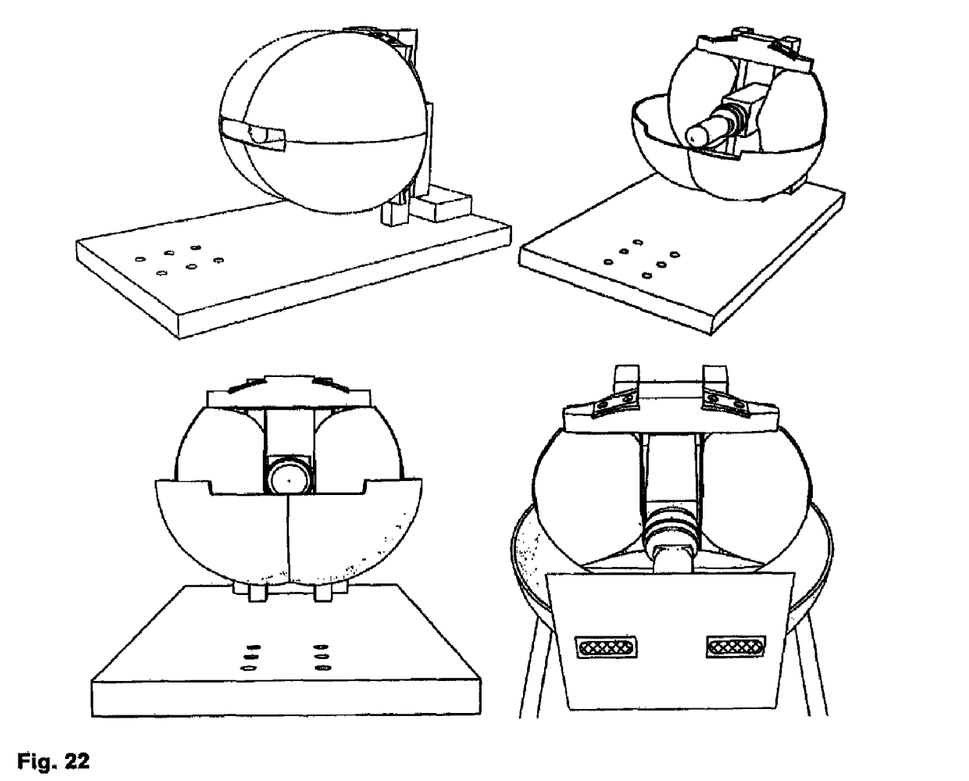
FIG. 22 shows a demonstrator manufactured by nickel electroforming.

Referring now to FIGS. 21 and 22, a demonstrator prototype has been fabricated to prove these design principles. For easier handling, instead of a projector arc lamp (whose high flux cannot be dimmed; it also has high UV emission), an automotive H7 halogen lamp was selected. The H7 filament is a spiral enclosed by a cylinder of length L=4.3 mm and diameter D=1.55 mm. Its geometry forced the choice of the XX configuration, to avoid shading and mirror to lamp interferences. The design selected is an XX of the family N<0, M<0 and adjacent POE and SOE halves; and each half has a separate rectangular target, as shown in FIG. 21. Note that the 3D drawing in FIG. 21B shows the device rotated 90 degrees around the cylindrical source axis (z-axis) as compared with FIG. 14.

The prototype, manufactured by nickel electroforming, is shown in FIG. 22. The mirror coating is made of evaporated aluminium. The y>0 and y<0 halves of the SOE mirror were made as (identical) replicas of the mold. Similarly, the POE was made of two halves, but in this case the POE was split into x>0 and x<0 halves, for easier demolding.

The demonstrator shown in FIGS. 21 and 22 was manufactured by nickel electroforming. The POE reflector half with x>0 is removed in the last three pictures of FIG. 22 to show the source and the SOE. In the lower left picture in FIG. 22 (taken along the z-axis from the target, positive z, end) the images of the filament on the target plane can be seen.

The XX designs in previous sections are free-form surfaces, but symmetric about the plane x=0, with normal vectors to the mirrors contained in that plane. Therefore, the x=0 section of the mirrors is a 2D optical system, similar to, for instance, the one shown in FIG. 12. The 2D étendue calculation in x=0, once the field of view is fixed, gives the distance between the target points $WF_{03}$ and $WF_{04}$ (see FIG. 9).

After presenting the efficiency limitations of some conventional condensers, the applicants have developed new condenser configurations based on the XX 3D design. These have capabilities unattainable with rotationally symmetric optics, particularly the control of the rotation of the projected source images. They are designed with the SMS3D design method, which can be combined with the Étendue Squeezing techniques of the above-referenced WO 2007/016363. Ray traces made in equal conditions (Power Transmitted v. target étendue) show a theoretical collection efficiency gain of up to 200% for rectangular apertures with 4:1 aspect ratio. A demonstrator has been built by electroformed nickel to show the concept.

FIG. 34 shows an example of an automotive light bulb incorporating the optics of FIG. 14 and FIG. 22. The "target" in this case is merely notional, because the emitted beam is intended to be directed onto the road ahead of the vehicle. The emitted beam is shaped partly by the optics of the POE and SOE, and partly by the exit aperture, which is an aperture at the boundary between the two POE halves at the side furthest from the SOE. In FIG. 22, the exit aperture is rectangular. In an automotive headlamp, the exit aperture may be more elaborately shaped to form the shape required by appropriate regulations. That shape typically requires a strictly defined top cut-off, and a strictly defined, often asymmetrical, cut-off on the side towards oncoming traffic, but may be more generous on the bottom and the curb side.

Interesting features of the present devices include the following:

The differentiation of 8 different families that can be designed (FIG. 13).

The 4 families for which the signs of magnifications M and N (as defined above) are equal (i.e., M×N>0) has the following property: if we take one spherical wavefront from one point of the object, the wavefront after the reflection of the primary will be such that one caustic surface is real while the other caustic surface is virtual. This has no precedent, up to our knowledge, in imaging optics applications.

The overall geometry of the design when the object is a plane (FIG. 3 to 5), which includes the mirror, object and target relative positions, avoids blocking the light, and the normal vectors to the object and the target are not parallel but form about 90°.

The overall geometry of the design when the source is a cylinder (FIG. 3 to 5), which includes the mirror positions and object and target positions, avoids blocking the light.

For the case of the filament (see FIG. 14B), the use of two halves makes a good coupling (i.e. transforming one to the other) of the input and output ray-bundles of FIG. 8. Although both the input and output ray bundles are connected sets in phase space (we refer here to phase space x-y-z-p-q-r, where $p^2+q^2+r^2=1$) they have very different topologies. The key is the two-halves design, which has the effect that the intermediate ray bundle (i.e. the ray bundle between the two mirrors) is NOT a connected set in the phase space. Such disconnection is created by means of the discontinuity of the normal vector along the line of the primary mirror at the plane y=0. Since the output bundle is connected, such a re-connection (topological gluing) is provided by the discontinuity of the normal vector along the line of the secondary mirror at plane y=0. Such respective disconnection-reconnection in primary and secondary mirrors are produced according to the mapping of the contours which is shown in FIG. 14.

The nomenclature that has been used in this specification is the following:

A "conventional condenser" is that composed by an elliptical or a parabolic rotational mirror (and usually also a flat glass cover) and the source (i.e. arc lamp or halogen bulb), with the axis of the source lamp coincident with the mirror optical axis. The mirrors are typically designed to collect the bulb light emitted in the 45°-135° angular range from the optical axis, as shown in FIG. 32.

A "real arc source" is the non-homogeneous luminance distribution of the arc of a real lamp. This distribution has approximately rotational symmetry. However, it is typically not uniform along its length, nor across its width as seen in side view. It is usually measured and ray-sets are generated. See FIG. 1 and FIG. 23 for examples of a measured real arc source.

"Meridian angular size" is the full-angle subtended by the transmitted ray bundle at any point of the space in the meridian plane. When the bundle is not homogeneous, the full angle is defined using the isoluminance surface enclosing a selected percentage of the bundle flux.

"Sagittal angular size" is the full-angle subtended by the transmitted ray bundle at any point of the space in the sagittal plane. When the bundle is not homogeneous, the full angle is defined using the isoluminance surface enclosing the selected percentage of the bundle flux.

"Projected images of the arc" are those images that would theoretically be produced by a pinhole on the exit aperture of the condenser, then projected onto the target plane, where the total illuminance distribution is the sum of an array of such pinholes completely covering the exit aperture.

The "ideal condenser" is that achieving the maximum collection efficiency allowed by the étendue conservation theorem. Given a source model, the ideal condenser's performance does not depend on the specific target aperture contour, but only on the target aperture area and illumination angle, i.e., its étendue. The ideal condenser must project identical images from all points of the condenser exit surface, and the contour of such images must coincide with the contour of the target aperture.

Although specific embodiments have been described, the skilled reader will understand how features of different embodiments may be combined and substituted, and such combinations are within the scope of the present invention.

REFERENCES

R. Winston, J. C. Miñano, P. Benítez, Nonimaging Optics, Academic-Elsevier, Burlington, (2005)

H. Moench et al. "Higher Output, More Compact UHP Lamp Systems", SID Symposium Digest of Technical Papers, (2002)

U.S. Pat. No. 6,356,700 by Stroebl

U.S. Pat. No. 6,672,740 by Li

JP Patent Application H7-174974 A by Tadaaki

U.S. Pat. No. 5,966,250 by Shimizu

D. S. Dewald, S. M. Penn, M. Davis, "Sequential Color Recapture and Dynamic Filtering: A Method of Scrolling Color", SID International Symposium, 40.2, (2001)

J. A. Shimizu, "Scrolling Color LCOS for HDTV Rear projection", SID International Symposium, 40.1, (2001)

M. Duelli, A. T. Taylor, "Novel polarization conversion and integration system for projection displays", SID International Symposium, 16.3, (2003)

We claim:

1. An optical system for directing light from a source onto a target, the source having an axis, a first end directed towards the target, and a second end, and the target being generally in a plane perpendicular to the axis of the source, the optical system comprising:
   a pair of primary optical elements symmetrical with respect to a reference plane passing through the source and perpendicular to the target plane and arranged to direct light from the source towards the second end;
   wherein the two primary optical elements together encircle the source, and meet along the reference plane on both sides of the source; and
   a pair of secondary optical elements symmetrical with respect to said reference plane and arranged at the second end to direct the light from respective ones of the primary optical elements onto the target;
   wherein each primary optical element and its associated secondary optical element form at the target plane an image of the source with an image axis lying in the plane of the target that is an image of the source axis, and the image axes are oriented in the same direction.

2. The optical system of claim 1, wherein the source is elongated, and each primary optical element and, its associated secondary optical element form an elongated image of the source in the target plane.

3. The optical system of claim 1, wherein each primary optical, element directs light from the source to the secondary optical element on the opposite side of the reference plane.

4. The optical system of claim 1, wherein the two secondary optical elements meet along the reference plane at a boundary extending across a line in the reference plane passing through the target and the source.

5. The optical system of claim 1, wherein light passing from the source to the target forms a single connected set in phase space between the source and the primary optical elements and between the secondary optical elements and the target, and is disconnected in phase space between the primary optical elements and the secondary optical elements.

6. The optical system of claim 1, which is a transparent bulb enclosing the light source, and wherein the primary and secondary optical elements are reflective parts of an envelope of the bulb.

7. The optical system of claim 1, wherein the primary and secondary optical elements are so shaped that images of the source on the target plane from all parts of the primary optical element are formed on the target plane with substantially the same shape, size, and orientation, so at least 70% of the flux from the source is integrated in a rectangular target of the same etendue as the source.

8. The optical system of claim 1, wherein the primary and secondary optical elements are so shaped that images of the source on the target plane from all parts of the primary optical element are formed on the target plane with substantially the same, shape and size, wherein the images are rectangles having a ratio of length to width in the range of from one quarter to two thirds.

9. A lamp assembly comprising a condenser that is an optical system according to claim 1 with a cylindrical lamp, as the source.

10. A projector comprising a lamp assembly according to claim 9, an image-forming modulator at the target, and projection optics to project an image generated by the modulator acting on the light from the lamp assembly.

11. An optical system for directing light from a source having an axis from a first end of the optical system onto a target on the axis, the optical system comprising:
    a primary optical element arranged to direct light from the source towards a second end of the optical system opposite the first end; and
    a secondary optical element arranged at the second end of the optical system on the opposite side of a reference plane containing the axis from the primary optical element to direct the light from the primary optical element onto the target;
    wherein at least 70% of the light reaching the target from the source reflects off both the primary and the secondary optical elements.

12. The optical system of claim 11, wherein the target: is on a target plane perpendicular to the axis and the primary and secondary optical elements are so shaped that images of the source on the target from all parts of the primary optical element are formed on the target with an image axis lying in the target plane that is an image of the source axis; and with substantially the same shape, size, and orientation of the image axes, so at least 70% of the flux from the source is integrated in a rectangular target of the same etendue as the source.

13. The optical system of claim 11, wherein the target is on a target plane perpendicular to the axis and the primary and secondary optical elements are so shaped that images of the source on the target from all parts of the primary optical element are formed on the target, with an image axis lying in the target plane that is an image of the source axis, and with substantially the same shape and size, wherein the images are rectangles having a ratio of length to width in the range of from one quarter to two thirds.

14. A lamp assembly comprising a condenser that is an optical system according to claim 11 with a cylindrical lamp as the source.

15. A projector comprising a lamp assembly according to claim 14, an image-forming modulator at the target, and projection optics to project an image generated by the modulator acting on the light from the lamp assembly.

16. A projector comprising an optical system according to claim 11 with an image forming modulator at the source.

17. An optical system for directing light from a source having first and second ends and an axis onto an axial target, the optical system comprising:
    a primary optical element arranged to direct light from the source towards the second end; and
    a secondary optical element arranged at the second end to direct the light from the primary optical element towards the first end onto the target;
    wherein at least 70% of the light reaching the target from the source reflects off both the primary and the secondary optical elements.

18. The optical system of claim 17, wherein the primary and secondary optical elements are on opposite sides of a reference plane passing through the source and the target.

19. The optical system of claim 18, further comprising a second primary optical element symmetrical with the first under reflection in the reference plane passing through the source and the target, and a second secondary optical element symmetrical with the first under reflection in the reference plane, wherein the source emits light onto both the primary and the secondary optical element, wherein the two primary optical elements together encircle the source, and meet along the reference plane on both sides of the source.

20. The optical system of claim 1, wherein the primary and secondary optical elements are so shaped that images of the source on the target from all parts of the primary optical element and via both primary and secondary optical elements are formed on the target with substantially the same shape, size, and orientation, so at least 70% of the flux from the source is integrated in a rectangular target of the same etendue as the source.

* * * * *